Dec. 20, 1966  W. B. BANKS  3,292,423
METHOD OF AND APPARATUS FOR MEASURING VISCOSITY
Filed June 23, 1964
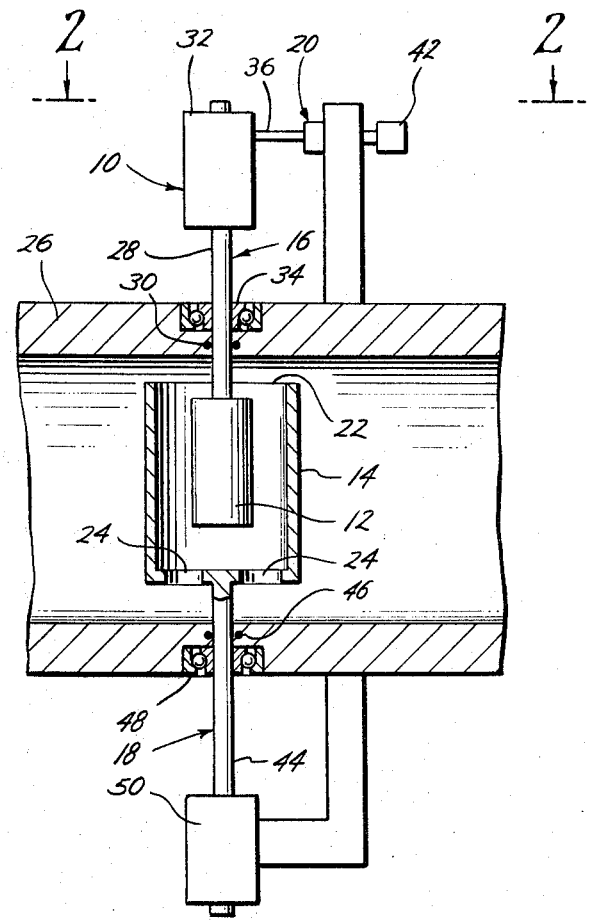
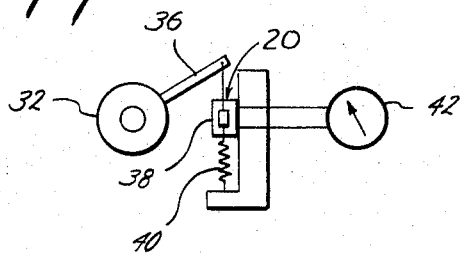
William B. Banks
INVENTOR.
BY James F. Weiler
Jefferson D. Giller
William A. Stout
Paul L. DeVerter II
ATTORNEYS ന
United States Patent Office 3,292,423
Patented Dec. 20, 1966

3,292,423
METHOD OF AND APPARATUS FOR MEASURING VISCOSITY
William B. Banks, Houston, Tex., assignor to Automation Products, Inc., Houston, Tex., a corporation of Texas
Filed June 23, 1964, Ser. No. 377,362
5 Claims. (Cl. 73—60)

The present invention relates to a method of and an apparatus for measuring viscosity, and more particularly, relates to a method of and apparatus for measuring viscosity of a fluid in a container through a seal by parallel surfaces.

While measuring viscosity by measuring the shearing torque between parallel surfaces is old, it has not been possible in the past to obtain accurate viscosity measurements in a closed container where the measurement must be taken through a seal in the container. That is, the seal exerts a retarding force on the measuring linkage thereby preventing any accurate measurement of the shearing torque between parallel surfaces. Furthermore, while the effects of the seal on the measurement may be initially measured and then taken into account on the viscosity measurements, this is not satisfactory as the effect of the seal on the measurements varies with operating conditions such as temperatures and pressures and with wear.

Therefore, it is the general object of the present invention to provide a method of and an apparatus for measuring viscosity of a fluid in a container through a seal by means of parallel surfaces wherein the effect of the seal on the viscosity measurement is accurately measured.

A still further object of the present invention is the provision of a method of and an apparatus for measuring viscosity of a fluid in a container through a seal by means of parallel surfaces wherein the effect of the seal on the viscosity measurement may be periodically measured and compensated for.

Still a further object of the present invention is the provision of a method of and an apparatus for measuring viscosity of a fluid in a container through a seal by parallel surfaces by rotatably driving each of the surfaces at the same constant speed through a seal in the container, measuring the force required to drive one of the surfaces, stopping the rotation of the second surface, and again measuring the force required to drive said one surface whereby the differences between the first and second measurements is a measurement of the viscosity of the fluid being measured without the effect of the seal on the measurement.

Yet a further object of the present invention is the provision of a method of and apparatus for measuring viscosity of a fluid in a container through a seal by providing a pair of parallel surfaces in the container, a first rotatable drive means sealingly extending through the container and connected to one of said surfaces, measuring means for measuring the torque applied to said one surface for measuring the viscosity of fluid spaced between the parallel surfaces, and a second rotatable drive means connected to the second of the parallel surfaces for zeroing the apparatus to compensate for the friction effect of the seal on the first rotatable drive means.

Yet a further object of the present invention is the provision of a method of and apparatus for measuring viscosity of a fluid in a container through a seal by parallel surfaces and compensating for the effect of the seal by rotatably driving one of the surfaces through the seal while rotatably driving the second of said surfaces at the same speed and direction as the first surface and measuring the force required to drive the one surface thereby measuring the effect of the seal, stopping the second surface and again measuring the force required to drive said one surface whereby the differences between the first and second measurements is an indication of the viscosity of the fluid being measured.

Other and further objects, features and advantages will be apparent from the following description of a presently preferred embodiment of the invention, given for the purpose of disclosure, and taken in conjunction with the accompanying drawings, where like character references designate like parts throughout the several views and where, FIGURE 1 is an elevational schematic, in cross-section, illustrating an apparatus according to the invention, and FIGURE 2 is a cross-sectional view taken along the line 2—2 of FIGURE 1.

Referring now to the drawings, and particularly to FIGURE 1, the reference numeral 10 generally designates the viscosity meter of the present invention and generally includes a pair of parallel surfaces 12 and 14, a first rotatable drive means 16 for rotating surface 12, a second rotatable drive means 18 for rotating surface 14, and a suitable measuring means 20 for measuring the force exerted by the first rotatable drive means 16.

The parallel surfaces 12 and 14 may be of any suitable shape, and are here shown as the surface 12 being a cylinder and the surface 14 being a cup opened at end 22 and having openings 24 as second end whereby fluid in a container 26 such as a pipeline may pass between the parallel surfaces 12 and 14. Thus, as is common in viscosity measurements, one of the parallel surfaces is rotated relative to the second surface and the amount of torque required to maintain a fixed speed is a measurement of the viscosity of the fluid present between the surfaces 12 and 14.

In order to rotate one of the parallel surfaces such as 12, a rotatable shaft 28 is provided connected to the surface 12 and extends through a conventional seal 30 in the wall of container 26, and is in turn driven by a constant speed motor 32 which by way of example only may be a synchronous motor. In addition, suitable bearings 34 are provided around the shaft 28. Thus, the motor 32 may rotate the parallel surface 12 relative to the parallel surface 14. And as best seen in FIGURE 2 suitable measuring means 20 is provided which by way of example only, may include a torque arm 36 connected to the housing of the motor 32 and is also connected to a suitable potentiometer 38 and spring 40. Thus, assuming that the motor rotates in a direction to cause the motor housing and arm 36 to move in a counterclockwise direction against the action of the spring 40, the conventional potentiometer 38 is correspondingly moved to provide a read-out on a suitable indicating meter 42. Thus, the amount of torque transmitted by the motor 32 to the shaft 28 is indicated on the read-out meter 42.

However, the torque indicated on the indicating meter 42 includes both an indication of the shearing torque between surfaces 12 and 14 and the torque applied by the seal 30 against the shaft 28. Furthermore, the force applied by the seal may vary with operating conditions such as pressure, temperature, and use. Therefore, the indicating meter 42 does not provide an accurate measurement of only the shearing torque between the parallel surfaces 12 and 14 so as to provide an accurate viscosity measurement.

Therefore, to provide an apparatus for and a method of compensating for the torque friction loss in the seal 30 a second rotatable drive means 18 is provided which may include a rotatable shaft 44 connected to the second parallel surface 14 and extending through the container 26 through seal 46 and bearing 48 and connected to a constant speed motor 50, which by way of example only may be a synchronous motor. Thus, when the motor 50 is driven at the same constant speed and direction as the motor 32, both of the parallel surfaces 12 and 14 will rotate together along with the fluid therein and thus will not provide any shearing torque measurement to the meter 42 due to viscosity. Thus, with both parallel surfaces 12 and 14 rotating in the same direction and at the same speed the only force being measured by the meter 42 is the force applied to the rotating rod 16 by the seal 30. This provides a method of determining the seal torque under actual operating conditions so that the meter 42 may be zeroed while rotating both of the parallel surfaces 12 and 14 at the same speed and in the same direction. After the meter 42 is zeroed, the motor 50 is stopped. Then the rotation of the parallel surface 12 relative to the parallel surface 14 provides an additional shearing torque due to the viscosity of the fluid between the parallel surfaces which is then transmitted through the measuring means 20 to the now zeroed indicating meter 42. Thus a direct reading of only the viscosity of the fluid between surfaces 12 and 14 is provided which may be properly calibrated. And, of course, since the torque due to the seal 30 will vary with operating conditions such as temperature, pressure and use, the indicating meter 42 may be periodically zeroed to compensate for this torque effect due to seal 30 by starting the motor 50 and rotating the surface 14 in the same direction and same speed as the surface 12 as previously described.

In use, the apparatus 10 is first operated to zero or to compensate for the torque or friction loss in the seal 30. This is accomplished by rotatably driving each of the parallel surfaces 12 and 14 at the same constant speed and in the same direction by the motors 32 and 50, respectively. Since under this operation the measuring circuit 20 will not be measuring viscosity but only the torque loss due to the seal 30, the indicating circuit 42 will thus indicate or measure only the torque or friction loss due to the seal 30. Thus, the indicating meter 42 may be zeroed if desired. After zeroing or noting the torque loss in the seal 30, parallel surface 14 is stopped so that there will be a shearing torque between the rotating surfaces 12 and 14 due to the viscosity of fluid between the two parallel surfaces. Thus, if the instrument 42 was previously zeroed, the movement of the arm 30 against the spring 40 will move the potentiometer 38 to cause a change in the reading of the indicating instrument 42 which may be calibrated to read directly the viscosity of the fluid being measured.

It is believed that the method of the invention is apparent from the foregoing description of a presently preferred apparatus of the invention. The method, however, provides a measurement of the viscosity of a fluid in a container through a seal by parallel surfaces and includes the steps of rotatably driving one of the surfaces through the seal, rotatably driving the second of the surfaces at the same speed as the one surface and measuring the force required to drive said one surface while the second surface is being driven, stopping the second surface and again measuring the force required to drive the one surface whereby the differences between the first and second measurement is an indication of the viscosity of the fluid being measured. The method further comprehends the measurement of viscosity of a fluid by rotatably driving each of the surfaces at the same constant speed and direction through a seal in the container, zeroing a measuring instrument which measures the force required to drive one of the surfaces while the surfaces are rotated, and stopping the rotation of the second surface whereby the measuring instrument will then measure the viscosity of the fluid between the parallel surfaces.

The present invention, therefore, is well suited to carry out the objects and attain the ends and advantages mentioned as well as others inherent therein. While a presently preferred embodiment of the invention is given for the purpose of disclosure, numerous changes in the details of construction, arrangement of parts and steps of the process may be made which will readily suggest themselves to those skilled in the art and which are encompassed in the spirit of the invention and the scope of the appended claims.

What is claimed is:

1. An apparatus for measuring viscosity of a fluid in a container through a seal comprising,
    a pair of parallel surfaces positioned in the container,
    a first constant speed rotatable drive means positioned outside the container and extending through a seal into the container and connected to one of the surfaces,
    measuring means for measuring the rotative force applied to said one surface, and
    a second constant speed rotatable drive means having the same speed as said first drive means and connected to the second of the surfaces and rotating the second surface in the same direction as the first surface.

2. An apparatus for measuring viscosity of a fluid in a container through a seal comprising,
    a pair of parallel surfaces positioned in the container,
    a rotatable shaft connected to each of the surfaces and extending through seals outside of said container,
    drive means positioned outside of container and connected to each of said rotatable shafts for rotating the surfaces in the same direction and at the same speed, and
    torque measuring means for measuring the torque supplied to one of said surfaces.

3. A method of measuring viscosity of a fluid in a container through a seal by parallel surfaces comprising,
    rotatably driving one of said surfaces relative to the second surface through said seal,
    rotatably driving the second of said surfaces at the same speed and direction as said one surface,
    measuring the force required to drive said one surface while the second surface is being driven,
    stopping the second surface, and
    measuring the force required to drive said one surface while said one surface is rotated but said second surface is stopped whereby the differences between the first and second measurements is a measurement of the viscosity of the fluid between the parallel surfaces.

4. A method of measuring viscosity of a fluid in a container through a seal by parallel surfaces in said container comprising,
    rotatably driving each of said surfaces at the same constant speed and direction through a seal in said container,
    measuring the force required to drive one of said surfaces,
    stopping the rotation of the second surface, and again measuring the force required to drive said one surface whereby the differences between the first and second measurements is a measurement of the viscosity of the fluid being measured.

5. A method of measuring viscosity of a fluid in a container through a seal by parallel surfaces in said container comprising, rotatably driving each of said surfaces at the same constant speed and direction through a seal in said container, zeroing a measuring instrument measuring the force required to drive one of said surfaces while both of the surfaces are rotated, and stopping the rotation of the second surface whereby the measuring instrument will measure the viscosity of the fluid between the parallel surfaces.

References Cited by the Examiner
UNITED STATES PATENTS 2,817,231   12/1957   Barstow _____ 73—60

DAVID SCHONBERG, *Primary Examiner*.